(12) United States Patent
Tamai et al.

(10) Patent No.: US 6,578,385 B1
(45) Date of Patent: Jun. 17, 2003

(54) FRAME FOR SUPPORTING GLASS PLATE DURING TEMPERING

(75) Inventors: Koji Tamai, Mie (JP); Kazuhiro Kumao, Mie (JP)

(73) Assignee: Central Glass Company, Limited, Ube (JP)

( * ) Notice: Subject to any disclaimer, the term of this patent is extended or adjusted under 35 U.S.C. 154(b) by 84 days.

(21) Appl. No.: 09/635,648

(22) Filed: Aug. 10, 2000

(30) Foreign Application Priority Data

Aug. 16, 1999 (JP) ............................................. 11-230114

(51) Int. Cl.⁷ ............................................. C03B 27/044
(52) U.S. Cl. ...................... 65/348; 65/355; 65/374.12
(58) Field of Search ........................... 65/103, 104, 114, 65/288, 348, 355, 356, 374.12

(56) References Cited

U.S. PATENT DOCUMENTS

| 3,236,621 A | * | 2/1966 | Caldwall et al. | 65/103 |
| 3,586,492 A | * | 6/1971 | McMaster | 65/104 |
| 3,600,150 A | * | 8/1971 | Rougeux | 65/104 |
| 3,741,743 A | * | 6/1973 | Seymour | 65/287 |
| 3,776,708 A | * | 12/1973 | Seymour | 65/114 |
| 4,217,126 A | * | 8/1980 | Hagedorn et al. | 65/106 |
| 4,661,142 A | | 4/1987 | Bartusel et al. | 65/348 |
| 4,906,271 A | | 3/1990 | D'Iribarne et al. | 65/273 |
| 5,069,703 A | | 12/1991 | D'Iribarne et al. | 65/104 |
| 5,203,905 A | * | 4/1993 | Kaster et al. | 65/107 |
| 5,383,950 A | | 1/1995 | Hashemi | 65/348 |

FOREIGN PATENT DOCUMENTS

| DE | 4034600 | 4/1993 |
| JP | U 62153342 | 9/1987 |
| JP | B 2614907 | 2/1997 |

* cited by examiner

*Primary Examiner*—Sean Vincent
(74) *Attorney, Agent, or Firm*—Crowell & Moring LLP

(57) ABSTRACT

The invention relates to a frame for supporting a glass plate during a quenching of the glass plate. This frame includes a supporting ring for supporting thereon the glass plate, and a heat-resistant fabric tensioned and covering a top surface of the supporting ring to allow the glass plate to rest on the heat-resistant woven fabric. The supporting ring has a shape substantially conforming to a contour of the glass plate. A quenching air of the tempering is allowed to pass smoothly by tensioning the heat-resistant fabric.

4 Claims, 4 Drawing Sheets

FRAME FOR SUPPORTING GLASS PLATE DURING TEMPERING

BACKGROUND OF THE INVENTION

The present invention relates to a frame for supporting a glass plate in a horizontal position during a tempering process.

There is known a so-called quick sag bend method, which is used for tempering vehicular window panes. In this method, a glass plate is heated, while it is conveyed in a heating furnace by a transporting roller. The glass plate is stopped in a second half of the heating furnace. Then, the glass plate is pressed against a bending mold, which is positioned above the glass plate, by blowing a high-temperature jet air against the glass plate, in order to bend the glass plate. After that, the glass plate is dropped on a supporting frame (a cold ring) having a shape conforming to the contour of the glass plate. Under this condition, a high-pressure quenching air is blown against the glass plate for tempering. However, the peripheral edge portion of the glass plate tends to become inferior in the tempered ratio as compared with the rest thereof, since it is in abutment with the supporting frame and thus may not receive the quenching air sufficiently.

U.S. Pat. Nos. 4,906,271 and 5,069,703, each corresponding to Japanese Patent JP-B2-2614907, disclose a supporting frame for supporting thereon a glass plate. This frame is punched in order to allow the passage of the quenching air therethrough. The frame is covered with a heat-resistant fabric.

U.S. Pat. No. 4,661,142, corresponding to French Patent FR 2572388, discloses another supporting frame including bearing members with bearing surfaces which support a glass sheet.

SUMMARY OF THE INVENTION

It is an object of the present invention to provide a frame for supporting a glass plate during a quenching of the glass plate, which is capable of achieving a smooth passage of a quenching air of the tempering.

According to the present invention, there is provided a frame for supporting a glass plate during a quenching of the glass plate. This frame comprises a supporting ring for supporting thereon the glass plate, and a heat-resistant fabric tensioned and covering a top surface of said supporting ring to allow the glass plate to rest on said heat-resistant woven fabric. The supporting ring has a shape substantially conforming to a contour of the glass plate. A quenching air of the tempering is allowed to pass smoothly toward a peripheral portion of the glass plate by tensioning the heat-resistant fabric. With this, it becomes possible to improve the peripheral portion of the glass plate in strength and to prevent deformation and the like of the peripheral portion.

DESCRIPTION OF THE PREFERRED EMBODIMENTS

With reference to FIGS. 1–5, a frame for supporting a glass plate during a quenching of the glass plate, according to a preferred embodiment of the present invention, will be described in detail in the following. It is preferable that the after-mentioned parts of the frame are made of a rigid metal(s) and have a heat-resistant anticorrosive coating thereon.

Figure 1:
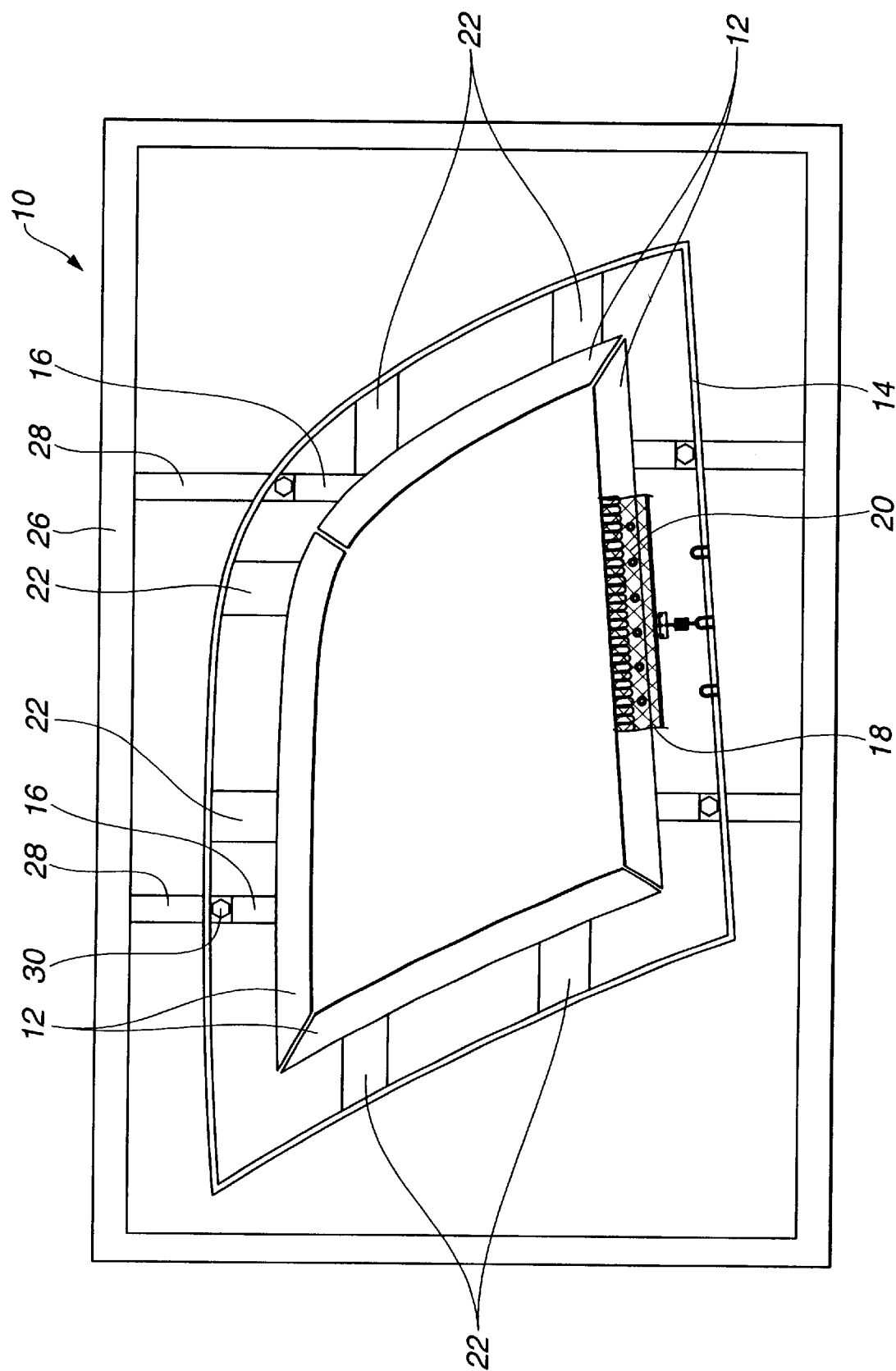
FIG. 1 is a plan view showing a frame according to a preferred embodiment of the present invention.

As is seen from FIG. 1, a frame 10 comprises (1) a supporting ring (cold or quenching ring) 12 for supporting thereon a peripheral edge portion of a glass plate and (2) an outer frame member 14 which is ring-like in shape and arranged outside of the supporting ring 12. The outer frame member 14 is secured to the supporting ring 12 through first connecting members 16. The outer frame member 14 may have substantially the same shape as that of the supporting ring 12 and may be substantially concentric with the supporting ring 12, as shown in FIG. 1. In other words, the supporting ring 12 and the outer frame member 14 may be mathematically similar figures. The supporting ring 12 may be made up of several parts (four parts in FIG. 1) or may be one-piece in construction. The supporting ring 12 may have a shape substantially conforming to the contour of a glass plate, for example, an automotive side window pane (see FIG. 1). Furthermore, the supporting ring 12 may have a size such that the periphery of a glass plate 24 is positioned between the outer and inner peripheral edges of the supporting ring 12, provided that the glass plate 24 supported on the supporting ring 12 is at an appropriate position relative to the supporting ring 12 (see FIG. 3).

As shown in FIG. 1, the frame 10 further comprises a heat-resistant fabric 18 covering the top surface of the supporting ring 12 to allow a glass plate to rest on the heat-resistant fabric 18. Although only a part of the heat-resistant fabric 18 is shown in FIG. 1, it actually covers the entirety of the top surface. Thus, the heat-resistant fabric 18 has a shape substantially conforming to the supporting ring 12. The heat-resistant fabric 18 may be a net formed by weaving a metal cord 20 made of stainless steel or the like. This metal cord 20 may be made of several very fine strands twisted or braided together. This type of heat-resistant fabric can serve as a cushion when a glass plate is supported on the supporting ring 12. The frame 10 may further comprise reinforcing members 22 (six reinforcing members are shown in FIG. 1) connecting the supporting ring 12 with the outer frame member 14, for reinforcing the supporting ring 12. Thus, a glass plate can assuredly be supported on the supporting ring 12.

As shown in FIG. 1, the frame 10 comprises a rectangular transport frame 26, which is arranged outside of the outer frame member 14, and second connecting members 28 (four in FIG. 1) each extending between the transport frame 26 and the first connecting member 16. Each second connecting member 28 is detachably attached to the first connecting member 16 by a faster 30 such as bolt and nut. Each of the first and second connecting members 16 and 28 may have a through opening for receiving therein a bolt. The through opening, which is formed on either of the first and second connecting members 16 and 28, may be elongate in shape in order to allow the adjustment of the position of the supporting ring 12 relative to the transport frame 26 by the sliding movement of the first connecting members 16 relative to the second connecting members 28. In other words, the supporting ring 12 is disposed at an appropriate position relative to the transport frame 26 by this sliding movement. Then, the first and second connecting members 16 and 28 are fastened together by the fasteners 30, followed by the use of the frame 10 in a tempering process.

Figure 2:
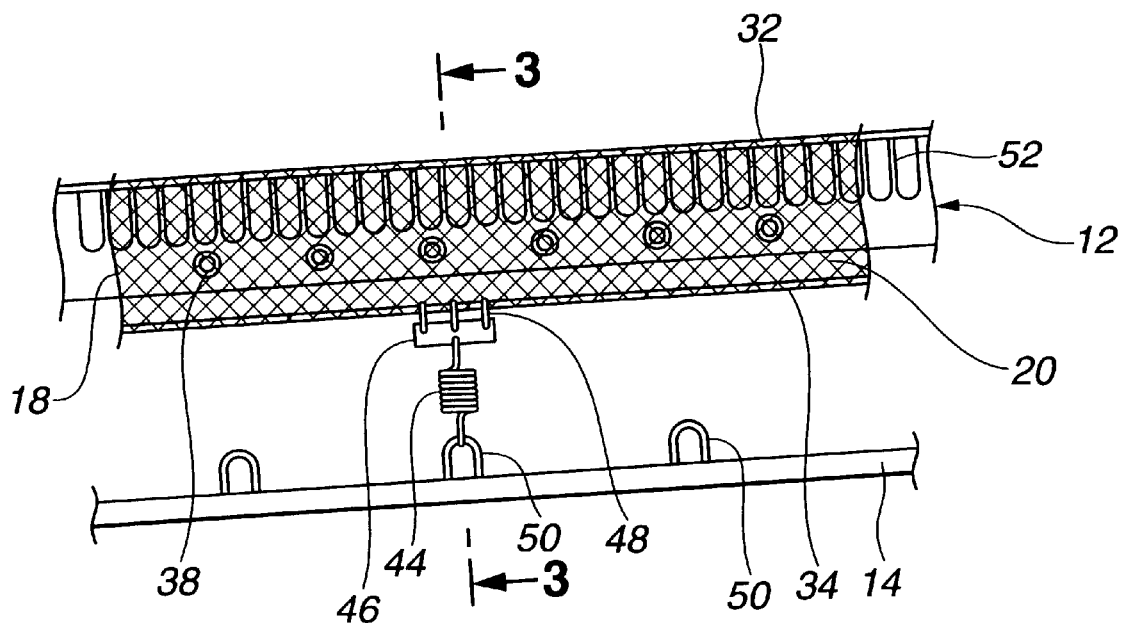
FIG. 2 is a partial, enlarged, plan view of the frame of FIG. 1.
Figure 3:
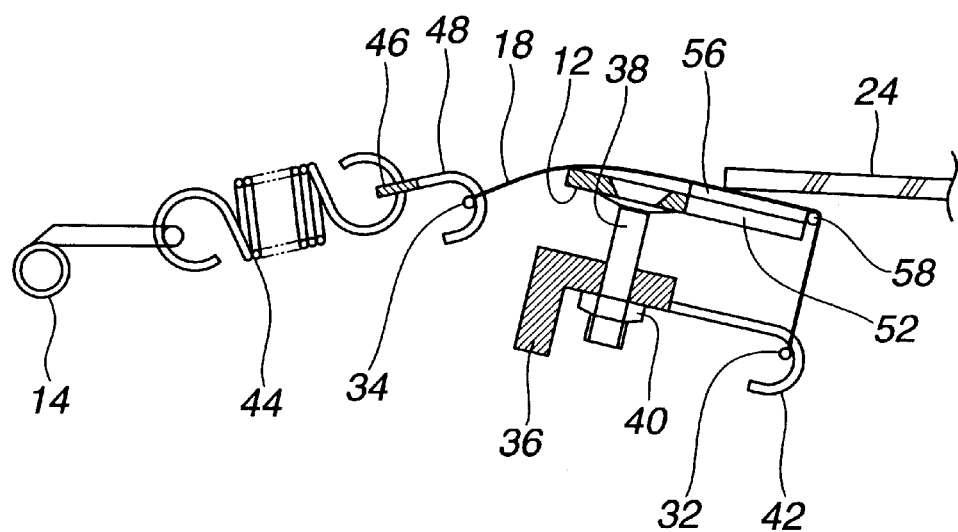
FIG. 3 is a sectional view taken along lines 3—3 of FIG. 2.

As shown in FIGS. 2 and 3, the heat-resistant fabric 18 is tensioned in order to allow a smooth passage of quenching air toward the peripheral portion of a glass plate during the tempering process. The structure or construction for tensioning the heat-resistant fabric 18 is described in detail as follows. The heat-resistant fabric 18 has inner and outer rods 32 and 34 respectively secured to the inner and outer ends of the net structure of the heat-resistant fabric 18. For example, the metal cord of the heat-resistant fabric 18 may be twisted around or welded to the inner and outer rods 32 and 34 for the securing. In other words, each of the inner and outer rods 32 and 34 has a ring-like shape and extends along the supporting ring 12. These rods may be made of steel. As is seen from FIG. 3, the supporting ring 12 has a plurality of lower brackets 36 (only one is shown in FIG. 3) each being positioned below the supporting ring 12 to have an appropriate distance therebetween and secured to the supporting ring 12 through a fastener such as a bolt 38 and a nut 40. At least one hook 42 (e.g., three hooks) extends inwardly from the lower bracket 36 and is in engagement with the inner rod 32 so that the heat-resistant fabric 18 takes at an appropriate position and fully covers the top surface of the supporting ring 12 when the heat-resistant fabric 18 is tensioned outwardly by a restoring force of springs 44 (only one is shown in FIG. 1 for simplification). As shown in FIG. 3, each spring 44 is in engagement with the outer rod 34 of the heat-resistant fabric 18 and with the outer frame member 14. Under this condition, each spring 44 is stretched to have a restoring force such that the heat-resistant fabric 18 is tensioned outwardly with a suitable tension. In fact, each spring 44 is in engagement at its inner end with a plate 46 having three hooks 48 each being in engagement with the outer rod 34 of the heat-resistant fabric 18. Furthermore, each spring 44 is in engagement at its outer end with a U-shaped catch 50 formed by welding or the like on the outer frame member 14. The catches 50 may be formed thereon at suitable intervals, as shown in FIG. 2. In contrast with the case shown in FIG. 3, it is optional to secure the outer rod 34 of the heat-resistant fabric 18 to the supporting ring 12 by the engagement with the hook 42 and to engage the inner end of the spring 44 with the inner rod 32 of the heat-resistant fabric 18.

Figure 4:
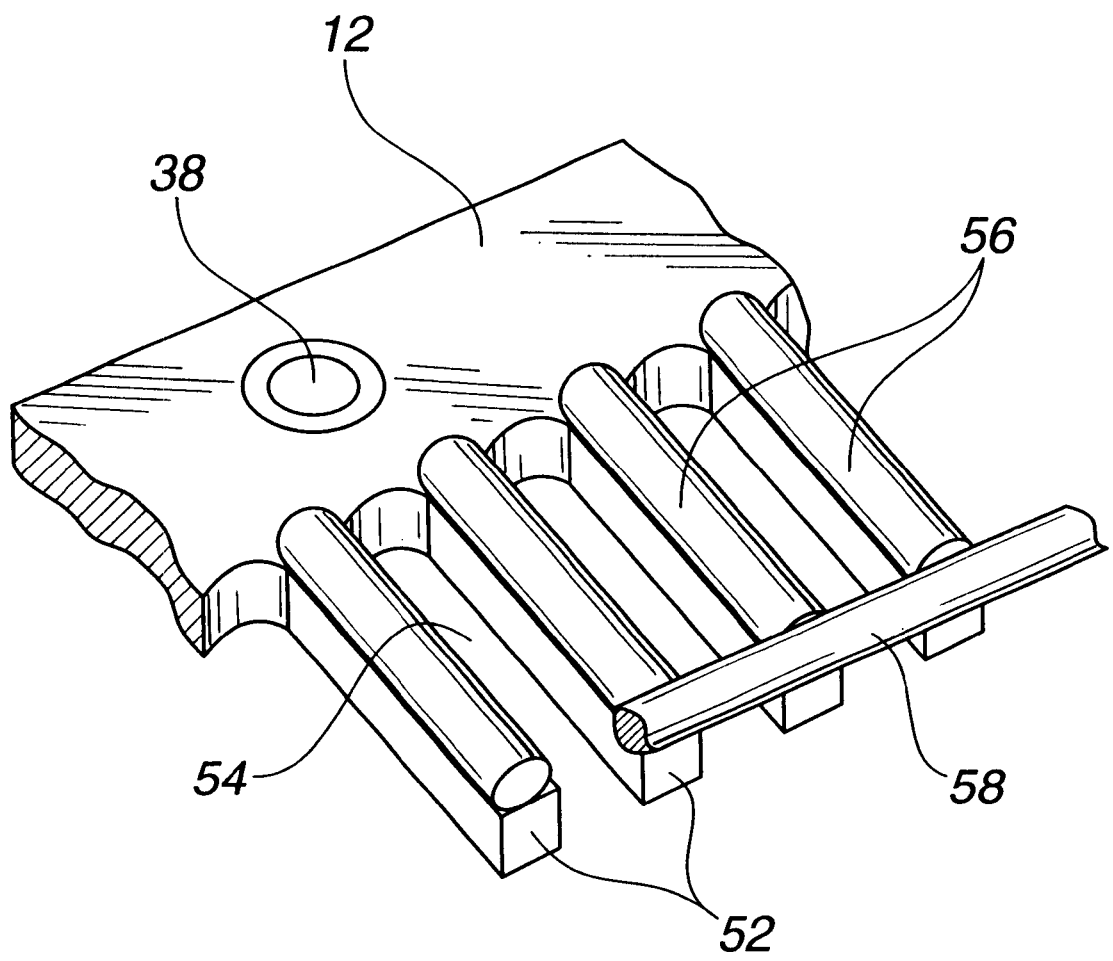
FIG. 4 is an enlarged, perspective view showing a part of a supporting ring of the frame of FIG. 1.

As is seen from FIGS. 1, 2 and 4, the supporting ring 12 has teeth 52 at its inner peripheral portion. Teeth 52 are partially shown in FIG. 1 for simplification. Adjacent two of the teeth have an opening 54 therebetween so that a cooling air of the tempering is allowed to pass through the opening 54. As shown in FIG. 4, the supporting ring 12 has reinforcing members 56 for reinforcing the teeth 52. Each reinforcing member 56 is attached to the top surface of the tooth 52 by welding or the like. Each reinforcing member 56 has a width and an axial length which are respectively substantially the same as those of the tooth 52, and has a curved top surface for supporting an edge of the glass plate 24 on the curved top surface. For example, each reinforcing member 56 may have a substantially circular or sectorial cross section to have such curved top surface. As shown in FIG. 3, when the glass plate 24 under a softened condition is placed on the reinforcing members 56 with an interposal of the heat-resistant fabric 18 therebetween, the manner of the contact between the edge of the glass plate 24 and each reinforcing member 56 is of nearly the point contact, since the reinforcing member 56 has a curved top surface to provide an axial line at the highest level. In other words, the degree of the contact between the glass plate edge and the reinforcing member 56 becomes substantially less by the provision of the curved top surface thereon, as compared with the case in which the reinforcing member 56 does not have such curved top surface. Thus, it becomes possible to prevent the glass plate from having deformation, undesirable marks and the like. Furthermore, a cylindrical rod 58 is attached to the inner ends of the reinforcing members 56 by welding or the like. This cylindrical rod 58 makes it possible to prevent the heat-resistant fabric 18 from being caught on the inner ends of the teeth 52 or of the reinforcing members 56 of the supporting ring 12. Thus, the cylindrical rod 58 makes it possible to smoothly move the heat-resistant fabric 18, when it becomes necessary to adjust the position of the heat-resistant fabric 18 on the supporting ring 12.

Figure 5:
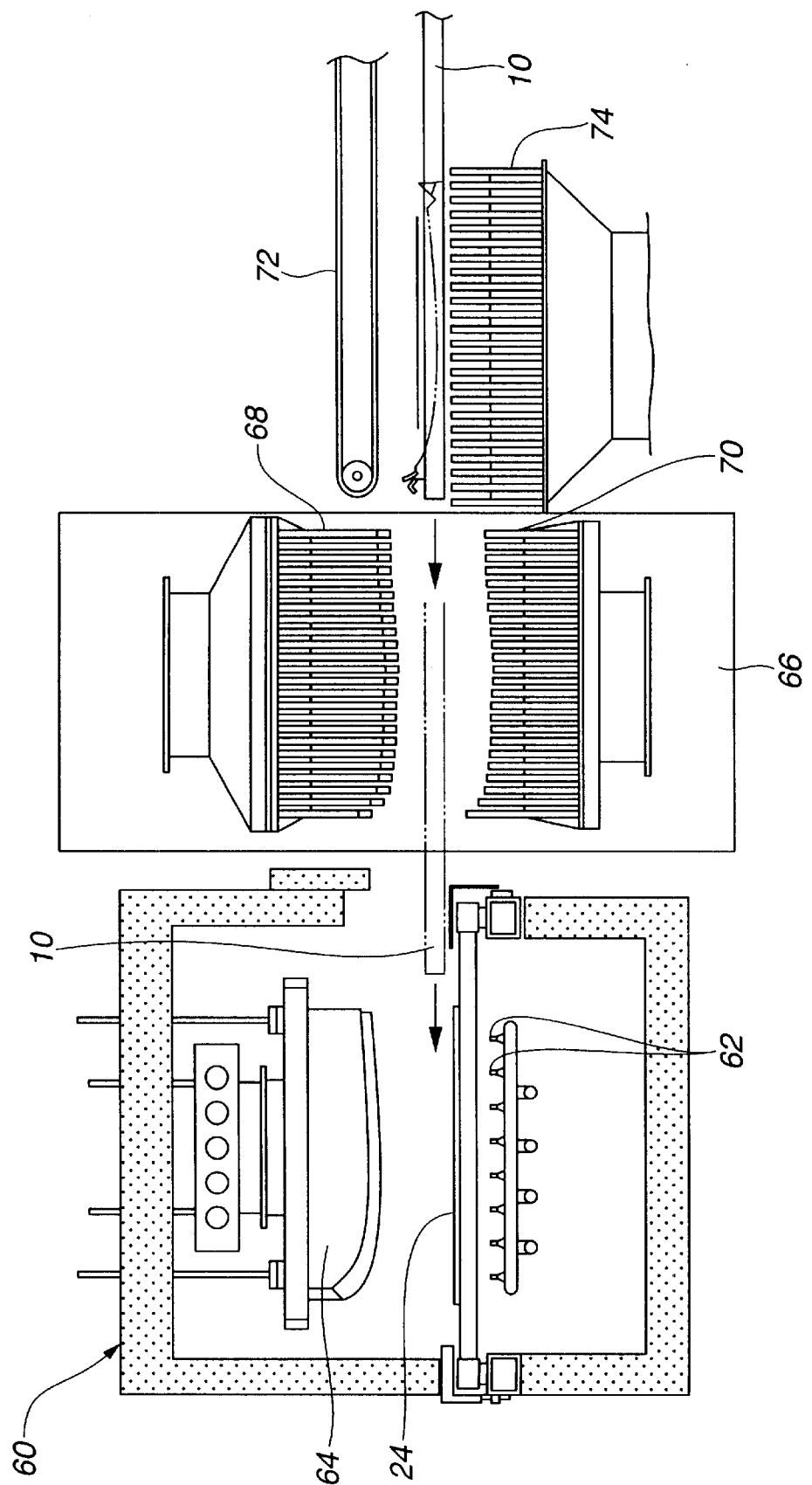
FIG. 5 is a schematic side view showing a tempering process of a glass plate.

As shown in FIG. 5, a so-called quick sag bend method can be used for tempering a glass plate. In this method, a flat glass plate 24 is heated in a heating furnace 60 to soften the same. Then, the glass plate 24 under the softened condition is floated and pressed against the bottom surface of a bending mold 64 by blowing a high-temperature jet air upwardly from nozzles 62 against the glass plate 24. At the same time, vacuum is applied to openings formed on the bottom surface of the bending mold 64 to adsorb the glass plate 24 thereto, thereby bending the glass plate 24 to have an appropriate shape (curved shape) conforming to the bottom surface of the bending mold 64. After that, the frame 10 is transported to a position directly below the glass plate 24 adsorbed to the bending mold 64. Immediately after this transportation, the bent glass plate 24 is dropped at an appropriate position on the supporting ring of the frame 10 by releasing the above vacuum and by stopping the air blow from the nozzles 62. Then, the frame 10, which supports thereon the glass plate 24, is transported from the heating furnace 60 to a quenching apparatus 66 by a shuttle conveyer or the like. In the quenching apparatus 66, a high-pressure quenching air is blown from upper and lower nozzles 68 and 70 against the upper and lower major surfaces of the glass plate to quench and thereby temper the glass plate. Upon this, the heat-resistant fabric 18 is tensioned as originally designed. Therefore, the quenching air is allowed to smoothly pass through the openings 54 of the supporting ring 12 and then the heat-resistant fabric 18. With this, the peripheral portion of the glass plate is also quenched and sufficiently tempered as originally designed. After that, the glass plate is floated from the frame 10 and then is brought into abutment against an upper conveyer 72 by upwardly blowing an air from nozzles 74 against the glass plate. Under this condition, the glass plate is transported downstream in its production line by driving the upper conveyer 72.

The entire disclosure of Japanese Patent Application No. 11-230114 filed on Aug. 16, 1999, of which priority is claimed in the application, including specification, claims, drawings and summary are incorporated herein by reference in its entirety.

What is claimed is:
1. A frame for supporting a glass plate during a quenching of the glass plate, said frame comprising:
   a supporting ring for supporting thereon the glass plate, said supporting ring having a shape substantially conforming to a contour of the glass plate;

a heat-resistant fabric tensioned and covering a top surface of said supporting ring to allow the glass plate to rest on said heat-resistant fabric;

an outer frame member arranged outside of said supporting ring to surround said supporting ring, said outer frame member and said supporting ring having substantially the same shape and being substantially concentric with each other; and a spring stretched between said outer frame member and said heat-resistant fabric such that said heat-resistant fabric is tensioned by a restoring force of said spring.

2. A frame according to claim 1, wherein said outer frame member is secured to said supporting ring.

3. A frame according to claim 1, wherein said heat-resistant fabric is a net formed by weaving a metal cord.

4. A frame according to claim 1, wherein said supporting ring has teeth along one side thereof, adjacent two of said teeth having an opening therebetween so that a quenching air of the tempering is allowed to pass through the opening.

* * * * *